United States Patent [19]

Van der Tol

[11] Patent Number: 5,325,221
[45] Date of Patent: Jun. 28, 1994

[54] WAVELENGTH DIVISION MULTIPLEXER AND DEMULTIPLEXER

[75] Inventor: Johannes J. G. M. Van der Tol, Zoetermeer, Netherlands

[73] Assignee: Koninklijke PTT Nederland N.V., Groningen, Netherlands

[21] Appl. No.: 941,402

[22] Filed: Sep. 8, 1992

[30] Foreign Application Priority Data

Sep. 10, 1991 [NL] Netherlands ............ 9101532

[51] Int. Cl.$^5$ .......................................... H04J 14/00
[52] U.S. Cl. ...................................... 359/116; 359/115; 385/28; 385/14; 385/45
[58] Field of Search .............. 359/114, 115, 116, 117, 359/156, 173, 124, 125; 385/28, 45, 14

[56] References Cited

U.S. PATENT DOCUMENTS

| | | | |
|---|---|---|---|
| 4,390,236 | 6/1983 | Alferness | 350/96.14 |
| 4,606,605 | 8/1986 | Ashkin et al. | 385/11 |
| 4,690,489 | 9/1987 | Neyer | 350/96.14 |
| 4,768,851 | 9/1988 | Shaw et al. | 385/28 |
| 4,906,064 | 3/1990 | Cheung | 385/16 |
| 5,009,477 | 4/1991 | Alferness et al. | 385/17 |
| 5,093,876 | 3/1992 | Henry et al. | 385/28 |
| 5,121,450 | 6/1992 | Eichen et al. | 385/45 |

OTHER PUBLICATIONS

K. O. Hill, "A Novel Low-Loss Inline Biomodal-Fiber Tap: Wavelength-Selective Properties", Jun., 1990, 484-486, IEEE Photonics Technology Letters, No. 7.

Primary Examiner—Richard E. Chilcot, Jr.
Assistant Examiner—Rafael Bacares
Attorney, Agent, or Firm—Frishauf, Holtz, Goodman & Woodward

[57] ABSTRACT

The invention provides a wavelength division multiplexer and a wavelength division demultiplexer by combining a wavelength-selective mode converter (3) with a wavelength-independent mode splitter (5). The demultiplexer comprises a monomodal input channel (1), an adapter (2) to the bimodal input of a 100%$TX_{00}$-$TY_{01}(\lambda_1)$ mode converter (3), a bimodal junction channel (4), and a mode splitter (5) having a first output channel (6) and a second output channel (7), both monomodal, the first output channel (6) having a higher propagation constant than the second. A $\lambda_1$ component, which propagates with a polarization TX (TE or TM) in an input signal $S_{/1}(\lambda_1, \lambda_2, \lambda_3 \ldots)$, will, after conversion in the converter (3), propagate in the intermediate channel (4), in the first-order guided mode having the polarization TY (TE or TM), and subsequently leave the splitter via output channel (7). The remainder of the input signal is not affected by the converter, therefore remains in the zero-order mode in the intermediate channel (4), and will leave the splitter (5) via output channel (6). The multiplexer operates in the opposite direction. Advantages: Completely producible in integrated form, no fabrication steps of a different type required other than for the fabrication of the connecting optical waveguides.

8 Claims, 1 Drawing Sheet

WAVELENGTH DIVISION MULTIPLEXER AND DEMULTIPLEXER

BACKGROUND OF THE INVENTION

1. Scope of the Invention

The invention is in the field of integrated optical components. More particularly, it relates to a wavelength division multiplexer and demultiplexer for combining or separating optical signals with different wavelengths in an optical waveguide.

2. Prior Art

Wavelength division multiplexers and demultiplexers for optical signals are known per se and are at present already commercially available in integrated form. They are used to increase the signal transmission capacity of an optical link, and they are intended, for example, for combining or separating signals from the two infrared windows, i.e. 1300 and 1550 nm. As disclosed in section S.2 of reference [1] (see below under C), they often work with directional couplers or Mach-Zehnder interferometers. The selective suppression of the unwanted wavelength is, however, often insufficient. The output channels are therefore fitted with grooves in which a grating filter is placed. This does, however, have the disadvantage that an integrated optical component is combined with a bulk element. Also known are components in which such gratings are designed in integrated form with the help of submicron technology. These have, however, a complicated structure, and their fabrication is correspondingly laborious.

Reference [2] discloses a wavelength-demultiplexer based on a bimodal optical fibre. This demultiplexer combines a wavelength-selective mode conversion achieved in a resonant bimodal optical fibre, with mode splitting provided by means of a bimodal fused directional coupler. As such, this known fibre-optical demultiplexer cannot be used in the above-mentioned application, as there is no bimodal fibre for the communication wavelengths in the said infrared windows. It is true that an integrated optical version of a wavelength-demultiplexer based on this known principle can be obtained by using, for the purpose of the desired wavelength-selective mode conversion, a readily integratable mode converter of a type such as that described in a reference [3] not published in time. A bimodal directional coupler can also, in principle, be integrated. Since, however, the coupling behaviour desired is very specific, and is based on interference, an integrated optical form does require extremely small fabrication tolerances. Moreover, a demultiplexer based on this known principle cannot, if the direction of propagation of the light is reversed, be used directly as a multiplexer. Furthermore, because of the presence of the directional coupler, no polarisation-independent multiplexer and demultiplexer can be provided on the basis of the known principle.

SUMMARY OF THE INVENTION

The present invention meets said drawbacks. It provides an integrated optical wavelength division multiplexer and an integrated optical wavelength division demultiplexer of the above-mentioned type which require no other fabrication steps than those necessary for fitting optical waveguides that are connected to them. The invention achieves this by combining the mode converter described in reference [3] with a mode splitter such as that disclosed, for example, in reference [4] (see FIG. 2(s) and accompanying text). To this end, the invention makes use, on the one hand, of the fact that the known mode converter is not only selective for a particular guided mode, but for that guided mode at a particular wavelength of the optical signal. This mode converter is therefore also wavelength-selective. On the other hand, the invention makes use of the fact that, in contrast, the known mode splitter is highly wavelength-independent. For this purpose, an integrated optical wavelength division demultiplexer and an integrated optical wavelength division multiplexer have the characteristics of claim 1 and of claim 6, respectively.

Reference [3], more particularly FIG. 5 and the accompanying description, already discloses a combination of a 50% mode converter with a mode splitter, but this combination is only usable as, and intended as, a polarisation splitter.

A (de)multiplexer according to the invention already contains per se, in the passive mode converter used, a kind of grating which can be given at will the appropriate wavelength selectivity. In this case, however, the submicron technology which is normally required for the production of gratings in integrated optics need not be used. Furthermore, the (de)multiplexer is suitable for processing composite optical signals which contain a large number of different wavelength components, i.e. for splitting off or adding one such wavelength component selectively according to wavelength.

References of which the disclosure are herein incorporated hereby, for additional information.

[1] T. Miyashita et al., "Integrated optical devices based on silica waveguide technologies", Invited paper SPIE, vol. 993 Integrated Optical Circuit Engineering VI (1988), pp. 288-294;

[2] K. O. Hill et al., "A novel low-loss inline bimodal-fiber tap: Wavelength-selective properties", IEEE Photonics Technology Letters, 2(1990) July, No. 7, New York, U.S., pp. 484-486;

[3] Mode converter application: NL-9100852 by Applicant, U.S. Ser. No. 07/880,705, filed May 8, 1992 (now allowed) and European Patent Application 92201338.8, filed May 11, 1992 in English;

[4] W. K. Burns and A. F. Milton, "Mode conversion in planar-dielectric separating waveguides" IEEE J. Quantum Electron., vol. QE-11., Jan. 1975, pp. 32-39.

BRIEF DESCRIPTION OF THE DRAWINGS

The invention is explained below in more detail, by means of a description of an exemplary embodiment by reference to a drawing, in which.

Figure 1:
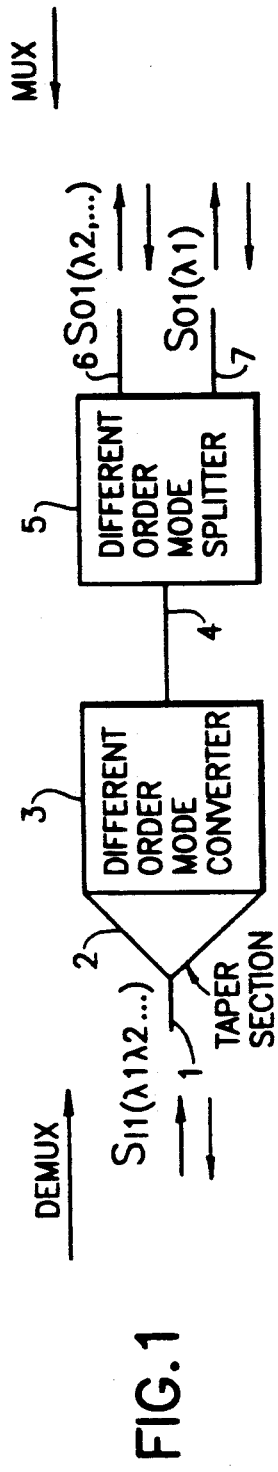
FIG. 1 shows a block diagram of a (de)multiplexer according to the invention for separating or combining an optical signal of a given wavelength having a defined polarisation and an optical signal of a different wavelength.

DESCRIPTION OF AN EXEMPLARY EMBODIMENT (De)multiplexers according to the invention are a direct application of mode converters as disclosed in reference [3]. In order not to duplicate this description unnecessarily, the contents of reference [3] shall, for the sake of brevity, be incorporated herein by reference in the present description. Various specific mode converters which are used in the (de)multiplexers to be described hereinafter are indicated in the manner used in that reference; in particular, reference should be made to Table 2 therein. Since, in addition, a mode splitter which is likewise known, for example from reference [4] (more particularly FIG. 2(a) therein), is used, the description of the (de)multiplexers is based on a drawing in which the Figures show only block diagrams. Each of the made converters indicated in Table 2 is selective for a particular pair of guided modes, though at the same wavelength $\lambda$ of the light. Only 100%-converters are used in the (de)multiplexers to be described. Converters of this type can be designed in such a way that optical signals of other wavelength(s) pass through converters this type virtually without hindrance. A mode converter which, for example, completely converts the guided mode $TE_{00}$ of an optical signal having the wavelength X into a guided mode $TM_{01}$ of an optical signal having the same wavelength is therefore denoted below by $100\%TE_{00}\text{-}TM_{01}(\lambda)$. More generally, a mode converter which completely converts a zero-order guided mode into a first-order guided mode of an optical signal of a particular wavelength $\lambda$ can be denoted by $100\%TX_{00}\text{-}TY_{01}(\lambda)$, where TX and TY may each represent one of the two polarisations TE and TM. In the drawing, the bimodal light channels are drawn as thick lines to distinguish them from monomodal light channels.

FIG. 1 shows a block diagram of a demultiplexer according to the invention. In the figure, 1 is a monomodal input channel for an incoming optical signal $S_{i1}(\lambda_1,\lambda_2,\lambda_3, \ldots)$ which is composed of optical signal components having wavelengths $\lambda_1,\lambda_2,\lambda_3 \ldots$, and of which at least the component having the wavelength $\lambda_1$ has a defined polarisation, for example TE or TM. A taper section 2 passes the monomodal input channel 1 to the bimodal input of a $100\%TX_{00}\text{-}TY_{01}(\lambda_1)$ mode converter 3 which, via a bimodal junction channel 4, is jointed to a mode splitter 5 having a first output channel 6 and a second output channel 7, both monomodal. This mode splitter 5 is of a type known per se, such as that disclosed, for example, by reference [4], in particular FIG. 2(a), the first output channel having a higher propagation constant than the second. That part of a signal which enters the mode splitter in a zero-order mode via the bimodal intermediate channel 4 will therefore leave this splitter via output channel 6, and that part of a signal which enters the mode splitter in a first-order mode via the bimodal intermediate channel 4 will leave this splitter via output channel 7. At the same time, TX is accordingly the defined polarisation TE or TM. The signal $S_{i1}(\lambda_1,\lambda_2,\lambda_3, \ldots)$ propagates in the input channel 1, but also in the taper section 2, in zero-order guided modes for all wavelengths. In the mode converter, which is selective for the wavelength $\lambda_1$, the zero-order guided mode of the component having the wavelength $\lambda_1$ and the defined polarisation is completely converted into the first-order guided mode having the polarisation TY, while the remaining light continues to propagate in the zero-order mode. Of the optical signal which has entered the mode splitter 5 via the bimodal intermediate channel 4, only the part which propagates in first-order mode is converted into a zero-order guided mode in output channel 7, the output channel having the lowest propagation constant. Conversely, that part of the optical signal which enters the mode splitter 5 in the zero-order mode will leave the mode splitter entirely via the output channel 6 having the highest propagation constant. Since only the light of the wavelength $\lambda_1$ is in first-order mode, an output signal $S_{o1}(\lambda_1)$ propagating via the output channel 7 will contain all of the $\lambda_1$ component from the original incoming optical signal $S_{i1}(\lambda_1,\lambda_2,\lambda_3, \ldots)$ in particular, with the polarisation acquired by said component in the converter. An output signal $S_{o1}(\lambda_2,\lambda_3, \ldots)$ propagating via the output channel 6 contains the remaining optical signal, i.e. the original incoming optical signal $S_{i1}(\lambda_1,\lambda_2,\lambda_3 \ldots)$ from which the $\lambda_1$ component has been removed.

If all the $\lambda$ components of the incoming optical signal $S_{i1}(\lambda_1,\lambda_2,\lambda_3 \ldots)$ propagate with the same polarisation, the mode converter 3 is preferably chosen in such a way that the polarisation TY differs from TX, since in that case additional polarisation filters can be used in the output channels 6 and 7 of the mode splitter 5, in order to increase further the suppression of unwanted wavelength components.

If the $\lambda_1$ component in the input signal does not have a defined polarisation, it can propagate both in a $TE_{oo}$ and in a $TM_{oo}$ guided mode. This means that a demultiplexer according to FIG. 1 having only one mode converter 3 can only split off the $\lambda_1$ component having one of the two polarisations, with the result that the $\lambda_1$ component having the other polarisation is still present in the output signal which appears on output channel 6. Hereinafter two demultiplexer variants are described by means of which this $\lambda_1$ component can be removed as well.

Figure 2:
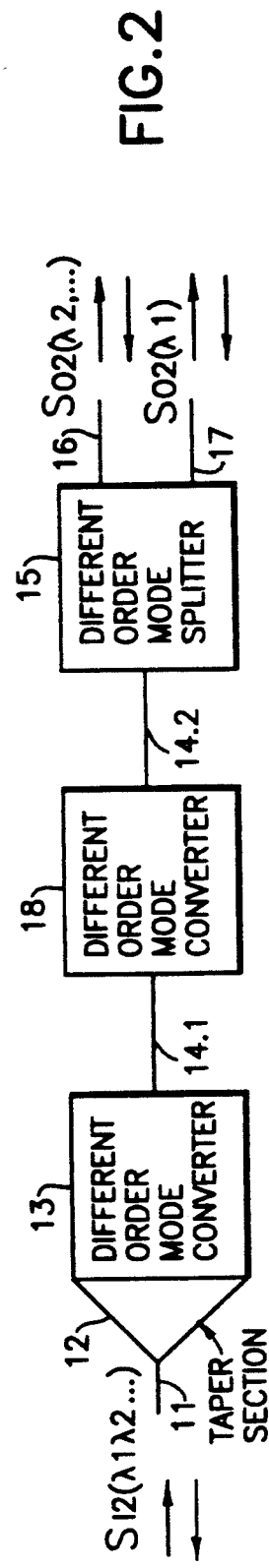
FIG. 2 shows the same as FIG. 1, but for an optical signal of the given wavelength having an undefined polarisation.

A first way is to incorporate, in addition, a second mode converter which is selective for the $\lambda_1$ component having the other polarisation in the bimodal intermediate channel 4 downstream of the first mode converter 3, namely the $100\%TX_{00}\text{-}TY_{01}(\lambda_1)$ mode converter 3. FIG. 2 shows the corresponding block diagram. Components corresponding to the demultiplexer of FIG. 1 have a number with the same last figure in the block diagram of FIG. 2. Said second mode converter is indicated by 18, and the sections of the intermediate channel 14 on both sides of the mode converter 18 are indicated by 14.1 and 14.2. The mode converter 18 is a $100\%TW_{00}\text{-}TZ_{01}(\lambda_1)$ mode converter, where TW and TZ denote polarisations which are not equal to TX and TY, respectively. Both polarisations of the $\lambda_1$ component then propagate in a first-order guided mode over section 14.2 of the intermediate channel 14. In order to achieve the result that the output signal $S_{o1}(\lambda_1)$ in the output channel 17 contains this component at least almost completely, it is further necessary to impose the requirement that the mode splitter 15 is polarisation-independent. In general, however, mode splitters of the above-mentioned type do have this property.

Figure 3:
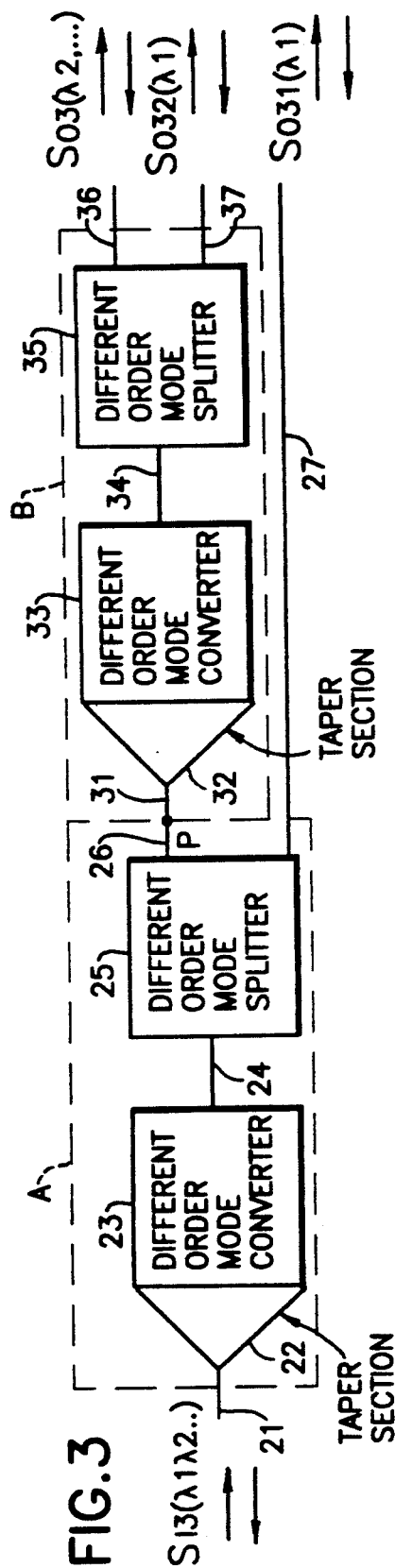
FIG. 3 shows a block diagram of a (de)multiplexer for consecutively separating or combining optical signals of the given wavelength having each of the two polarisations and an optical signal of a different wavelength.

A second way is to put two demultiplexers according to the block diagram of FIG. 1 in series. A block diagram of such an arrangement is shown in FIG. 3. The components of a first demultiplexer (broken-line box A) are numbered from 21 to 27 inclusive, the correspondence with the components of the demultiplexer according to the block diagram of FIG. 1 again being expressed in the last figure. The same applies to the components of the second demultiplexer (broken-line box B), which are numbered from 31 to 37 inclusive. The series connection is achieved by jointing the output channel 26 of the first demultiplexer to the input channel 31 of the second demultiplexer at point P. The converter 23 is a 100%$TX_{00}$-$TY_{01}(\lambda_1)$ converter. The mode converter 33 is a 100%$TW_{00}$-$TZ_{01}(\lambda_1)$ converter, in which TW, TX, TY and TZ again denote polarisations which may be chosen arbitrarily, obviously, of course, with the restriction that TW and TX must be different. An output signal $SO_{31}(\lambda_1)$ on output channel 27 consists of the $\lambda_1$ component which propagates with the TX polarisation in the input signal $S_{i3}(\lambda_1,\lambda_2, \ldots )$. The $\lambda_1$ component which propagates with the TW polarisation in the input signal $S_{i3}(\lambda_1,\lambda_2 \ldots )$ remains in the residual signal, which leaves the first demultiplexer via output channel 26 and which enters the second demultiplexer via input channel 31. In the second demultiplexer, after conversion into the first-order guided mode having the TZ polarisation, said $\lambda_1$ component with the TW polarisation also is split off from the composite signal and forms an output signal $S_{o32}(\lambda_1)$ in output channel 37 An output signal $S_{o3}(\lambda_2, \ldots )$ on output channel 36 now is the input signal which has been freed, at least almost completely, of the $\lambda_1$ component. An advantage of this demultiplexer is that both polarisations of the $\lambda_1$ component from the input signal are separately available for processing on the output channels 27 and 37, which may find a useful application in a polarisation-diversity receiver. An additional advantage obtained by choosing the polarisation TZ to be equal to TY. In that case, after all, in the further processing of the two signals which have been split off use can be made of optical components designed for the polarisation which can be processed most efficiently. In addition, the demultiplexer operates in that case as a completely passive polarisation converter which is independent of the incoming polarisation state.

Mode converters and mode splitters used in the demultiplexers described above operate in reverse for optical signals with an opposite direction of propagation. Thus a mode splitter becomes a combiner, and a 100%$TX_{00}$-$TY_{01}(\lambda_1)$ converter becomes a 100%$TY_{01}$-$TX_{00}(\lambda_1)$ converter. By now using the output channels (6,7; 16,17; 36,37,27) as input channels for input signals corresponding to the various $S_o$-signals, the original input signals $S_i$ are now obtained as output signals at the original input channels (1; 11; 21), which are now used as output channels. This means that the demultiplexers according to the invention operate in the reverse direction, that is to say with signal reversal, as multiplexers and that they can be used as such. This is indicated in the drawing by thick arrows DEMUX and MUX, respectively. In this case, care must be taken in the multiplexers according to the block diagrams of FIG. 1 and FIG. 3 that signals having the correct polarisations are supplied.

I claim:

1. Integrated optical wavelength demultiplexer for splitting off a first optical signal having a first wavelength from a composite second optical signal propagating in a first guided mode and having at least the first and a second wavelength, which demultiplexer comprises:

mode conversion means which are selective for the first wavelength for converting said first guided mode into a second guided mode, and
   a first mode splitter connecting to the mode conversion means,
   characterized in that said mode conversion means provides conversion between two guided modes of different order, and in that the first mode splitter is an asymmetrical Y-function coupled to said mode conversion means via an intermediate waveguide channel suitable for guiding modes of different order.

2. Wavelength demultiplexer according to claim 1, in which at least the first optical signal in the composite second optical signal has an undefined polarisation, characterised in that the mode conversion means comprise:

a monomodal input channel for the composite optical signal,
   a first adapter connecting to the input channel as the junction from a monomodal to a bimodal optical waveguide,
   a first mode converter which connects to the first adapter and which is selective for the first wavelength, for converting the zero-order guided mode of a first of the two polarisations (TE or TM) into the first-order guided mode of one of the two polarisations,
   a second mode converter which connects to the first mode converter and which is selective for the first wavelength, for converting the zero-order guided mode of the second of the two polarisations into the first-order guided mode of one of the two polarisations, and
   in that the Y-junction comprises a bimodal input channel and two monomodal output channels having different propagation constants.

3. Wavelength demultiplexer according to claim 1 in which at least the first optical signal to be split off from the composite optical signal has a defined polarisation, characterised in that the mode conversion means comprise:

a monomodal polarisation-maintaining input channel for the composite optical signal,
   an adapter as the junction from a monomodal to a bimodal optical waveguide,
   a mode converter which is selective for the first wavelength, for converting completely the zero-order guided mode having said defined polarisation to the first-order guided mode having one of the two polarisations; and
   in that the Y-junction comprises a bimodal input channel and two monomodal output channels having different propagation constants.

4. Demultiplexer according to claim 2, characterised in that a second Y-junction having a bimodal input channel and two monomodal output channels having different propagation constants is incorporated between the first and the second mode converter, the first mode converter connecting to the bimodal input channel and the second mode converter being connected, via a second adapter, to the output channel having the highest propagation constant.

5. Wavelength demultiplexer according to claim 2 or 3, characterised in that each of the mode converters is such that the signal converted into the first-order guided mode differs with regard to polarisation from that in the zero-order guided mode.

6. Integrated optical wavelength multiplexer for multiplexing a first optical signal propagating in a first guided mode and having a first wavelength and a second optical signal propagating in a second guided mode and having at least one second wavelength differing from the first wavelength so as to form a multiplexed signal propagating in the second guided mode and having at least signal components of the first and second wavelength, the multiplexer comprising:
  a mode combiner for combining the first optical signal and the second optical signal into a combined signal; and
  mode conversion means which connect to the mode combiner and which are selective for the first wavelength, for converting the first optical signal included in the combined signal into a signal propagating in said second guided mode of the second optical signal so as to form said multiplexed signal, the second optical signal being left unaffected,
  characterised in that the mode combiner includes an asymmetrical Y-junction coupled to said conversion means via an intermediate waveguiding channel for guided mode of different order, and the mode conversion means are provided for converting a guided mode into a guided mode or different order.

7. Wavelength multiplexer according to claim 6, in which the first optical signal has an undefined polarisation, characterised in that
  the Y-junction comprises a first monomodal input channel for the first optical signal and a second monomodal input channel for the second optical signal, which input channels differ in propagation constants, the first optical channel having the lowest propagation constant, and which input channels are combined into a bimodal intermediate channel, in which the first optical signal propagates in the first-order guided mode and the second optical signal propagates in the zero-order guided mode,
  in that the mode conversion means comprise:
  a first mode converter which connects to the intermediate channel and which is selective for the first wavelength, for converting at least most of the first-order guided mode of a first of the two polarisations (TE or TM) into the zero-order guided mode of one of the two polarisations,
  a second mode converter which connects to the first mode converter and which is selective for the first wavelength, for converting at least most of the first-order guided mode of the second of the two polarisations of the first optical signal into the zero-order guided mode of the other of the two polarisations, and
  an adapter, which connects to the second mode converter, as the junction from a bimodal to a monomodal optical wave-guiding output channel.

8. Wavelength multiplexer according to claim 6 in which the first optical signal has a defined polarisation, characterised in that
  the Y-junction comprises a first monomodal input channel for the first optical signal and a second monomodal input channel for the second optical signal, which input channels differ in propagation constants, the first optical channel having the lowest propagation constant, and which input channels are combined into a bimodal intermediate channel, and
  in that the mode conversion means comprise:
  a first mode converter which connects to the intermediate channel and which is selective for the first wavelength, for converting at least most of the first-order guided mode of said defined polarisation into the zero-order guided mode of one of the two polarisations,
  an adapter, which is connected to the first mode converter, as the junction from a bimodal to a monomodal optical wave-guiding output channel.

* * * * *